United States Patent [19]

Pagel et al.

[11] 4,099,507
[45] Jul. 11, 1978

[54] METHOD AND SYSTEM TO CONTROL THE DUTY CYCLE OF A PULSE VOLTAGE CHANGING IN FREQUENCY

[75] Inventors: Ernst-Olav Pagel, Freiberg; Wolfgang Borst, Schwieberdingen, both of Fed. Rep. of Germany

[73] Assignee: Robert Bosch GmbH, Stuttgart, Fed. Rep. of Germany

[21] Appl. No.: 669,814

[22] Filed: Mar. 24, 1976

[30] Foreign Application Priority Data

May 27, 1975 [DE] Fed. Rep. of Germany ....... 2523388

[51] Int. Cl.$^2$ .............................................. F02P 5/04
[52] U.S. Cl. ............................ 123/148 E; 123/117 D
[58] Field of Search ................ 123/117 D, 148 E; 235/150 L

[56] References Cited

U.S. PATENT DOCUMENTS

| | | | |
|---|---|---|---|
| 3,908,616 | 9/1975 | Sasayama | 123/117 D |
| 3,927,648 | 12/1975 | Kawai | 123/117 D |
| 3,942,491 | 3/1976 | Seite | 123/117 D |
| 3,946,709 | 3/1976 | Monpetit | 123/117 D |
| 3,955,723 | 5/1976 | Richards | 123/117 D |
| 3,996,911 | 12/1976 | Canup | 123/117 D |
| 4,009,697 | 3/1977 | Chateau | 123/117 D |

Primary Examiner—Ronald R. Cox

[57] ABSTRACT

To permit real-time counting of pulses representative of operating parameters of a moving body, for example in an internal combustion engine to control the ignition timing as a function of speed and other parameters in which, upon increase in speed of the engine, the ignition pulses follow each other rapidly and to permit sufficient current flow through the ignition coil for proper ignition, pulse sequences derived from the engine, for example as a function of speed, are converted into a higher frequency and the original pulses and the higher frequency are supplied to the counter as pulse trains so that the counter will reach the appropriate count state for which the ignition angle is to be computed at a time sufficiently in advance of the triggering of the ignition current, so that the time available for flow of ignition current will be increased, even at high engine speeds. Two pulse trains, differing in frequency and length, are applied to the counter, the counter being set for each triggering or ignition pulse to a predetermined value by a count angle computer stage, the pulse duration and cycling duration of the pulse voltage being determined by the counting time below and above a certain count state of the counter.

18 Claims, 3 Drawing Figures

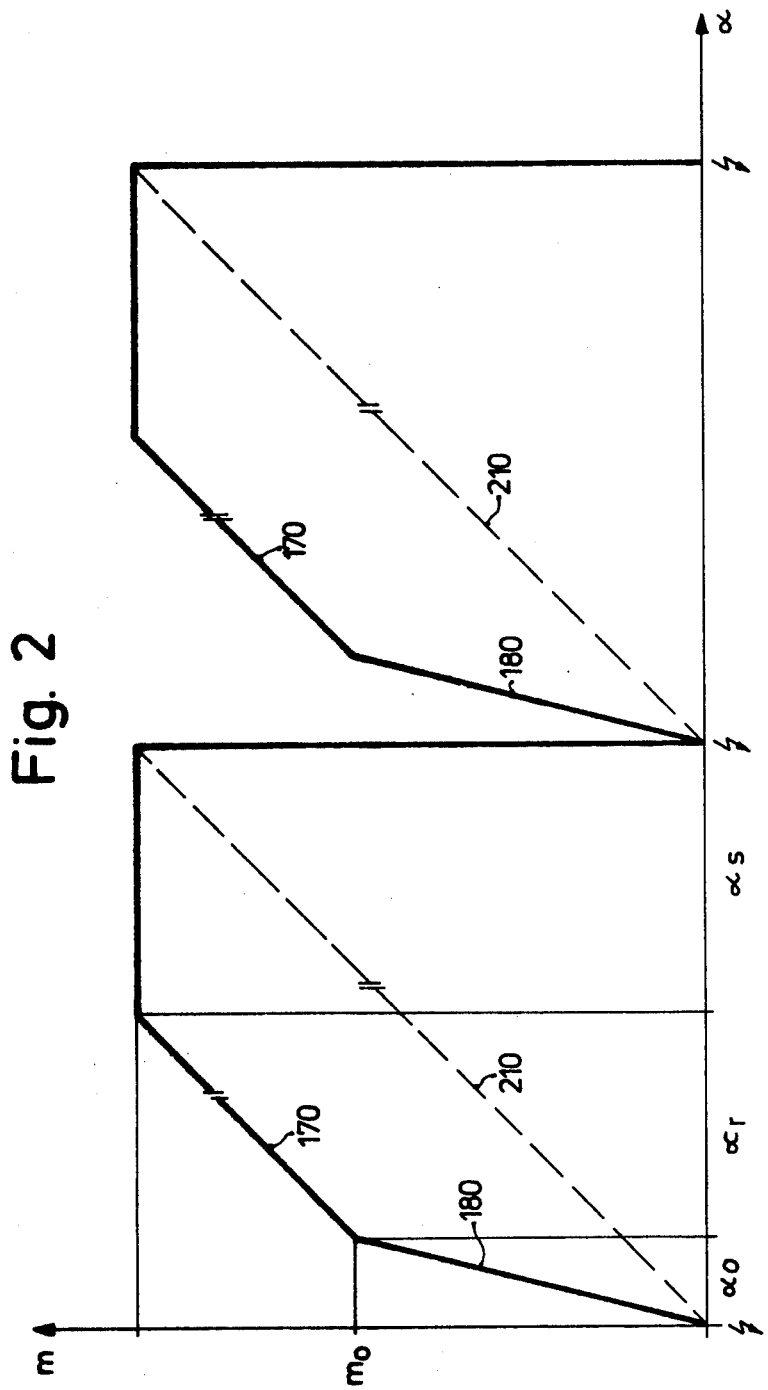

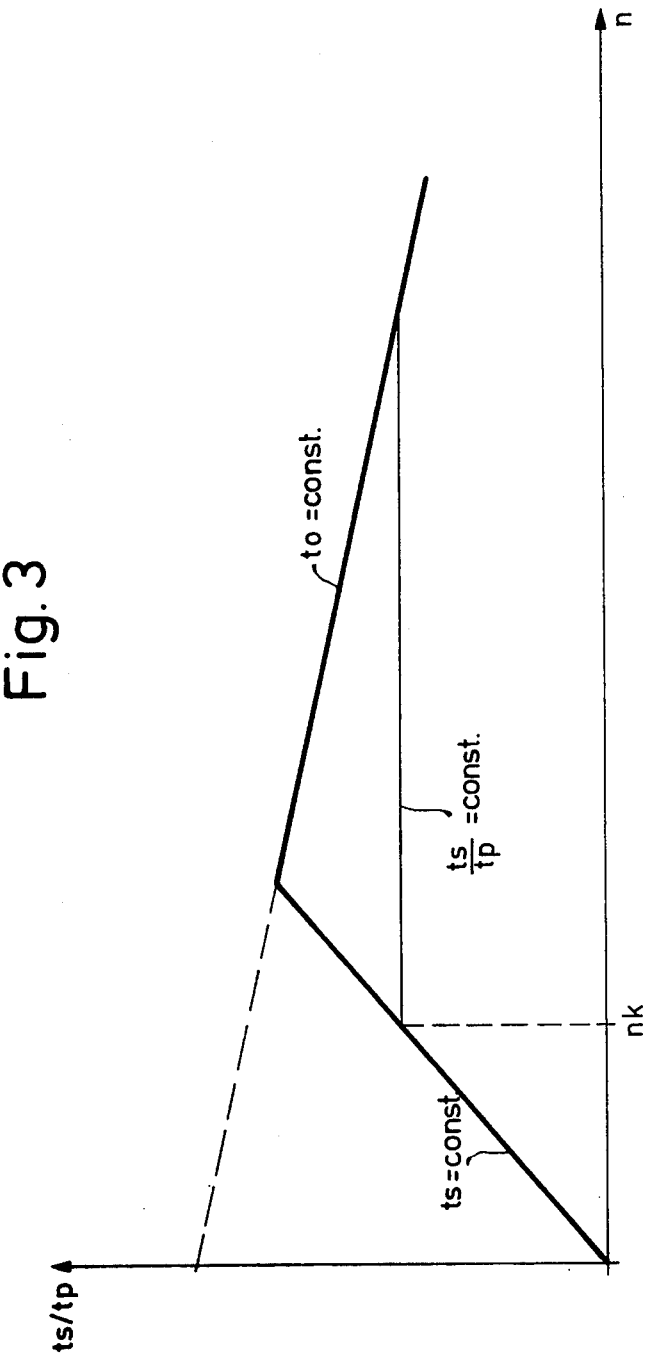

METHOD AND SYSTEM TO CONTROL THE DUTY CYCLE OF A PULSE VOLTAGE CHANGING IN FREQUENCY

Cross reference to related application: U.S. Ser. No. 660,558 filed Feb. 24, 1976, inventor Hartmut Mayer, (corresponding to German Priority Document P 25 12 166.8, Mar. 20, 1975), now pending and assigned to the assignee of the present application, and further: U.S. Ser. No. 650,971 filed Jan. 21, 1976 now Pat. No. 4,063,539 (corresponding to German Priority Document P 25 04 843.5, Feb. 6, 1975) inventor Gorille et al., assigned to the assignee of the present application, and further U.S. Pat. No. 3,903,857, issued Sept. 9, 1975, inventor Gunter Houig et al.

The present invention relates to a method and apparatus to control the duty cycle of a pulse train having wide swings in frequency, and more particularly to so control the time and recurrence rate of pulses applied to the ignition coil of an internal combustion engine that the current flow therethrough becomes essentially independent of engine speed.

Current flow through the ignition coil of internal combustion engines must be controlled in order to control the relationship of costs of the coil and power output thereof, and more particularly to reduce the overall costs of the ignition system, by operating the ignition system at its most efficient level. The ignition energy available to the spark plugs of an interal combustion engine is highest when the current flow through the ignition coil has a certain predetermined value. The energy available at the spark plug can be determined by parameters which include the coil inductivity, coil resistance, and duration of current flow therethrough; all three parameters together determine a timing, or timing constant, needed for the system. The open time, that is, the time between interruptions of current flow through the coil should be a certain minimum and preferably not be shorter than one millisecond. The minimum OFF-time of the coil is difficult to control when high-revolution internal combustion engines with many cylinders are supplied with ignition energy from a single coil. The problems particularly concern the temporal distance between pulses through the coil to trigger successive ignition events, that is, the gaps or OFF-periods of the pulses flowing through the coils to provide energy for successive ignition sparks.

Mechanical control of the ON and OFF time of current flow, particularly in high-speed engines, is limited in accuracy, as well as in life. Known analog control systems using electronic components have the disadvantage that they are subject to temperature and aging effects and lose accuracy upon being subjected to wide swings in ambient or operating temperatures and with time. Digital control systems, in order to accurately control current flow, have been proposed and, while maintaining accuracy much better with respect to temperature and aging influences, controlled current flow through the ignition coil with mathematical precision regardless of engine speed, results in sometimes inefficient utilization of the equipment of the ignition system as such.

It is an object of the present invention to provide a digital control system to control the ON-OFF pulse time of repetitive events, such as the pulses through the ignition coil of an internal combustion engine even though the frequency or recurrence rate of the pulses varies widely; which is essentially independent of temperature, is reliable, troublefree, and requires no or hardly any maintenance, while maintaining accuracy throughout its lifetime.

SUBJECT MATTER OF THE PRESENT INVENTION

Briefly, the method and system use digitally operating components; at least two pulse trains, differing in length, are applied to a counter; the counter is set to a reference value for each trigger pulse, the trigger pulse being computed in accordance with operating parameters of the engine with which it is associated, typically engine speed, loading, temperature or the like. Pulse duration and cycling duration of the pulse voltage are then determined by the count state below or above a predetermined count state of the counter.

In accordance with a feature of the invention, the length of the first pulse train is made dependent on speed; this speed dependence may start, however, only after a predetermined speed of the engine has been reached. Thus, up to a certain predetermined speed, the ON-time of the pulse will have a certain predetermined constant value; therefore, current flow through the ignition coil — if the system is applied to control ignition current flow in an internal combustion engine — will be constant up to that predetermined speed. As the speed increases, the ON-time will decrease to favor the OFF-time, so that the ignition spark will have sufficient sparking duration. Long spark duration is a precondition for complete combustion of the fuel-air mixture in the cylinders of an internal combustion engine for many types of engines; complete combustion, of course, is also one of the conditions for exhaust gases having a minimum of noxious or pollutant components.

In accordance with a feature of the invention, the system includes a counter to which pulse trains are applied over a transfer switch; the pulse trains have different frequencies, and which one of the trains of a frequency is applied to the counter is controlled by the transfer switch. The counter has a reset input. A timing circuit is provided, both the timing circuit and the reset input of the counter being controlled by the outputs of an ignition angle computation stage. The timing circuit controls the setting of the transfer switch; it may additionally be controlled by a signal representative of engine speed, so that the timing period can be varied only when a predetermined speed is exceeded. A decoding stage decodes the count state of the counter to then control ignition current flow. The decoding stage is preferably connected to a flip-flop, the output of which is gated with the output of the timing stage to ensure that the output of the gate, which controls current flow through the ignition coil, will have the proper duration.

The invention will be described by way of example with reference to the accompanying drawings, wherein:

FIG. 2 is a graph illustrating the change in count state $m$ (ordinate) with respect to crankshaft angle of the crankshaft of the internal combustion engine; and FIG. 3 is a graph illustrating the dependence on the ON-time and OFF-time with respect to engine speed.

Figure 1:
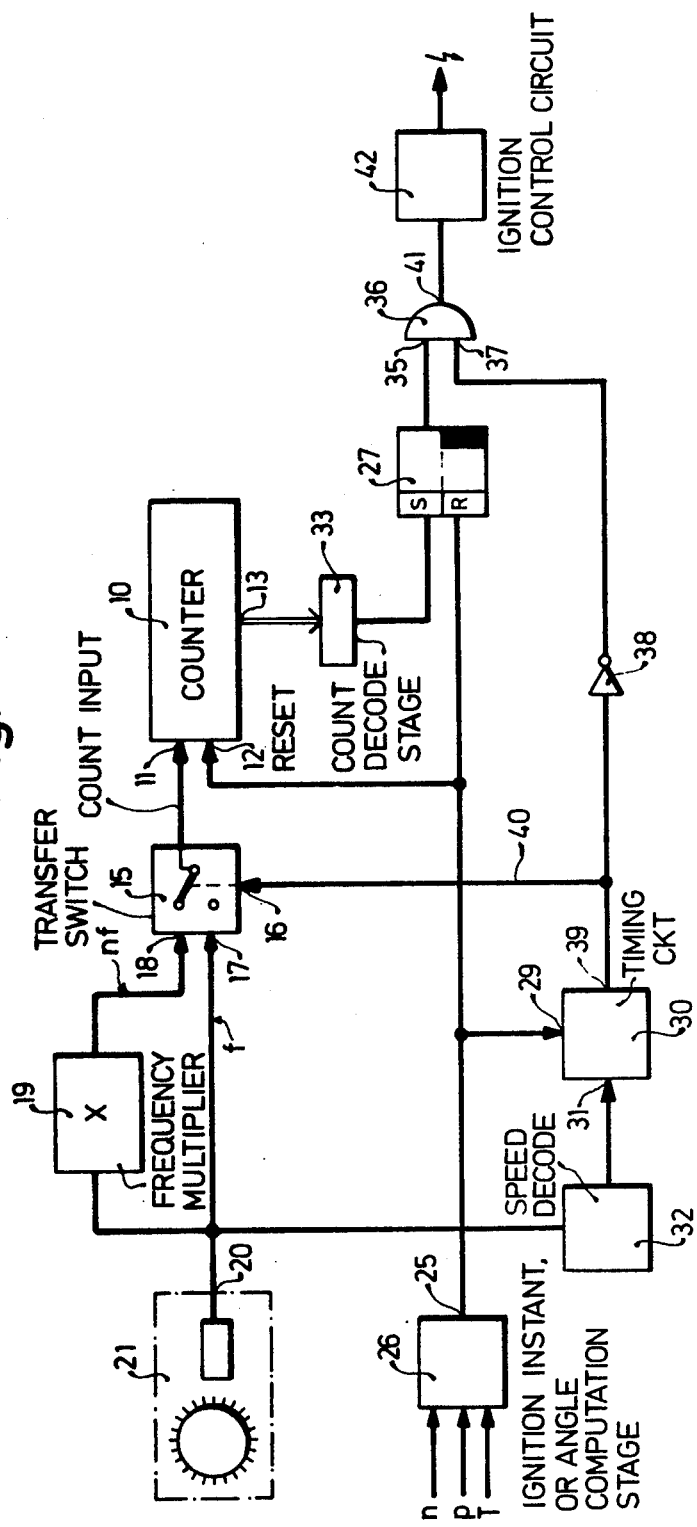
FIG. 1 is a highly schematic block diagram of the system applied to control the ON and OFF time of current flow through the ignition coil of an internal combustion engine.

A counter 10 (FIG. 1) has a count input 11, a reset or count state setting input 12, and a multi-terminal output 13. The application of counting pulses to count input 11 is controlled by a transfer switch 15. The position of transfer switch 15 is determined by the nature of a signal applied to a control input 16. The transfer switch 15 has two inputs; one input, 17, has a pulse train of frequency $f$ applied thereto, derived directly from the output 20 of a speed transducer system 21, shown only schematically, and well known. The input 18 of transfer switch 15 is connected to the output 20 of the transducer 21 through a frequency multiplier 19, so that the input thereon will be a multiple of the frequency $f$, that is, $nf$.

An ignition instant or angle computation stage 26 has inputs representative of engine speed $n$, engine loading p, represented for example by a signal representative of throttle position, intake manifold pressure (or, rather, vacuum) or the like, and other operating parameters of which only one is shown as an example, in this case temperature T. The stage 26 computes, in real time, from the input parameters applied thereto the proper ignition angle, with respect to upper dead-center (UDC) position of the piston. Such systems are known. The output 25 of stage 26 is connected to the reset or count number input 12 of counter 10; it is additionally connected to the reset terminal of an SR flip-flop (FF) 27; and additionally to the trigger input 29 of a timing circuit 30. Timing circuit 30 has a timing control input 31. Timing control input 31 is connected to the output 20 of the speed transducer 21 through a speed decoding stage 32, decoding the pulses from output 20 to control the timing circuit 30.

The output 13 of counter 10 is a multi-terminal output, as indicated by the double lines; it is connected to a count decoding stage 33, the output of which is connected to the SET input of the SR-FF 27. The direct output of FF 27 is connected to one terminal 35 of an AND-gate 36, the second terminal 37 of which is connected through an inverter 38 to the output 39 of timing circuit 30. The output 41 of AND-gate 36 is connected to customary ignition control and spark circuit 42 to provide an ignition spark for an ignition coil. Output 39 from timing circuit 30 is additionally connected by line 40 to the control input 16 of transfer switch 15.

Operation, with reference to FIG. 2: The ordinate in FIG. 2 represents the count state of counter 10. The ignition instants, represented as ignition angles for each ignition are determined or computed by the ignition instant or angle computation stage 26 (FIG. 1). The object of the system and of the method is to determine the time, with respect to angular position of the crankshaft, at which the current through the ignition coil must be turned ON, so that the resulting spark at the spark plug will have the desired energy — that is, will have the desired maximum energy. The speed transducer 21 may have an angular resolution, for example, of 1°. Applied to a four-cylinder, four-cycle internal combustion engine, an ignition event will then take place after each 180 pulses of the transducer 21. If these pulses are sequentially counted, a trigger signal is derived each time when the counter reaches 180. This case, which is a theoretical one only, is indicated in FIG. 2 by the broken line 210. If the scale of crankshaft angle and count state is the same, then line 210 will be a straight line with a slope of 45°.

In accordance with a feature of the present invention, timing circuit 30 is triggered each time after an ignition pulse to set transfer switch 15 into the position shown in FIG. 1. As a result, counter 10 will have count pulses applied thereto at a frequency which is a multiple ($nf$) of the frequency derived from transducer 21. These pulses will be summed in the counter 10. The counter will thus operate more rapidly and the counting rate is indicated by a straight line 180 having a slope greater than 45°. After a certain time $t_o$, which corresponds to a crankshaft angle $\alpha_o$, timing circuit 30 will provide an output signal which is applied through line 40 to transfer switch 15. The transfer switch 15 will change over to the position not shown in FIG. 1 and apply pulses of frequency f directly from the transducer 21 to counter 10. The counter 10 will now count at the rate shown by line 170 in FIG. 2, which is parallel to line 210. Counter 10 now counts the pulses at output terminal 20 directly. When the counter has reached a count state which is set into the count decoding stage 33, the count decoding stage 33 will indicate coincidence and provide an output signal to set the SR-FF 27. A positive output will be applied to input terminal 35 of AND-gate 36. If the speed of the engine is slow, then the number of pulses during $t_o$ will be small, so that the output signal of timing circuit 30 has already dropped off before the count state in the decoding stage 33 has been reached by counter 10. As a result, and due to the presence of inverter 38, input 37 will also have a positive signal applied, and AND-gate 36 will have a positive output to control ignition control circuit 42 to cause current flow through the ignition coil. The three angular ranges have been given the notations $\alpha_o$, $\alpha_r$ and $\alpha_s$ in FIG. 2, in which the angle $\alpha_s$ corresponds to the closed time of the ignition control circuit 42.

If the timing duration $t_o$ during which the timing circuit 30 remains active (for example the unstable time of a monostable FF) is increased, or if with the same timing interval to the speed increases, then the angular range $\alpha_r$ will decrease. It can thus be seen that control of timing of the time duration $t_o$ of timing circuit 30 permits control of the angular range $\alpha_s$, and the ON-time $t_s$ during which current will flow through an ignition coil as controlled by the ignition control circuit 42. Consequently, the angular range and the ON-time during which circuit 42 is controlled can be set to a predetermined value. Upon further increase of speed, and with constant time $t_o$, the ON angle $\alpha_s$ is increased with respect to the overall cycling time; the ON-time $t_s$ becomes independent of speed. If the ratio between ON-time and OFF-time should not exceed a certain predetermined value, for example due to heating of the ignition coil or of other components of the ignition control circuit 42, then the output signal of gate 36 must be so controlled that the ON-time $t_o$ of the timing circuit 30 decreases as speed increases. As a result, both ON and OFF-time are shortened simultaneously; the relationship of the ON-time and OFF-time to each other, however, will remain constant.

In combination with inverter 38, AND-gate 36 thus determines that the ON-time begins only when the output signal of the timing circuit 30 has dropped off, that is, when the timing period of timing circuit 30 has elapsed. SR-FF 27 provides a signal in any event when the value set in the count decode stage 33 is reached. At high speed and, simultaneously, comparatively long time $t_o$, this signal may occur before the time $t_o$ has elapsed. Some means must therefore be provided to delay the control signal for the control circuit 42, controlling the ignition coil e.g. by reducing $t_o$.

FIG. 3 shows the relationship of closed time $t_s$ to cycling time $t_p$ with respect to speed; the quotient of this ratio and of speed is constant due to the inversely proportional relationship between cycling time and speed.

Thus, the ratio of closing to opening time becomes independent of speed. A constant closing time results in a graph having a straight line starting at the origin.

For constant opening time, a curve (or, rather, straight line) with negative slope will result, as can be shown as follows:

$$t_p = t_s + t_o \cdot t_p = c/n;$$

$$t_s/t_p = 1 - c \cdot n$$

wherein $n$ is engine speed and $c$ is a constant. Linear relationship of the ratio of closing time to cycling time on speed is clearly apparent.

The current flow through the ignition coil provides not only energy to the spark plug but also causes losses in the ignition coil resulting in heating thereof. This ratio should, therefore, not become excessive. A constant ratio should be provided starting from a certain speed $n_k$, as seen in FIG. 3. This ratio, when constant, will be a straight line.

The operation of the system as illustrated in FIG. 3 can readily be constructed by the apparatus of FIG. 1. Up to the speed of the engine $n_k$, timing circuit 30 (FIG. 1) operates with a constant timing duration $t_o$; above that speed, however, the timing duration $t_o$ will become speed-dependent. The ON-time of current flow to the ignition coil, as well as the minimum open or OFF-time, can thus be controlled for most efficient energy use and optimum operation of the system. The speed decoding circuit 32, deriving its signals from speed transducer 21, is set to recognize the speed $n_k$ (FIG. 3) and until such speed has been reached, leaves timing circuit unaffected, so that timing circuit 30 will operate with a constant ON-time $t_o$; thereafter, the time $t_o$, corresponding to the angle $\alpha_o$ of the crankshaft (FIG. 2) is controlled in dependence of speed to hold the ratio $t_s/t_p$ constant (see FIG. 3).

The various elements used in the system of FIG. 1 are commercial articles and the following are suitable:

frequency multiplier stage 19: RCA CD 4014
timing stage 30: RCA CD 4047A
counter 10: RCA CD 4029.

Decoding stages 32, 33 may simply utilize a logic gate circuit.

Various changes and modifications may be made within the scope of the inventive concept. The system may be applied to various types of automotive ignition circuits, as well as to generally control the ON-OFF ratio of repetitively occurring pulses in which the repetition rate or frequency varies widely.

We claim:

1. Method to control the relationship between ON and OFF-time of ignition current flow in the ignition system of an internal combustion engine by providing a sequence of pulses which vary in frequency comprising
    generating first and second pulse sequences as a function of engine speed in which the first and second pulse sequences have different repetition rates or frequencies;
    accumulating in a counter (10) the pulses of the first pulse sequence ($nf$) and then of the second pulse sequence ($f$);
    generating a timing interval and controlling the accumulation of the first pulse sequence as a function of time;
    computing a theoretically optimum ignition instant and providing a control signal representative of said optimum ignition instant;
    setting the counter (10) to a number determined by said control signal and representative of said optimum ignition instant to thereby
    determine the count state of the counter at a predetermined time ($t_o + t_r$) after the counter has started to accumulate the pulses of said first and second frequencies;
    and providing an output pulse having a pulse duration ($t_s$) and a pulse cycling time ($t_o + t_r + t_s$) controlled by the count state of the counter at said predetermined time with respect to a reference number.

2. Method according to claim 1, wherein the step of determining the count state of the counter comprises
    setting the counter to a predetermined value and the step of providing the output pulse of said pulse duration and pulse cycling time comprises determining the count state of the counter above or below the reference number.

3. Method according to claim 1, wherein the duration of the time interval and hence of accumulation of the pulses of the first sequence is variable.

4. Method according to claim 3, wherein the duration of accumulation of the pulses of the first pulse sequence depends on the frequency or pulse repetition rate of at least one of the pulse sequences.

5. Method according to claim 4, wherein the duration of accumulation of the pulses is dependent on the frequency or pulse repetition rate of at least one of the pulse sequences when a predetermined limit of said frequency or pulse repetition rate has passed.

6. Method according to claim 1, wherein the pulse duration ($t_s$) of the output pulse is dependent on the duration of accumulation of pulses of the first pulse sequence ($fn$).

7. Method according to claim 1, wherein the frequency of one of the pulse sequences ($nf$) is a multiple of the frequency of the other pulse sequence ($f$).

8. Method according to claim 1, wherein the step of accumulating the pulses of the first and second pulse sequences comprises the step of first accumulating pulses representative of a multiple of the engine speed and then accumulating pulses representative of engine speed;
    controlling the time of accumulation of said pulses as a function of the computed, theoretically optimum ignition instant;
    and controlling the duration of accumulation of one of the pulse sequences during the entire interval of pulse sequence accumulation as a function of engine speed.

9. Method according to claim 8, wherein the pulse duration ($t_s$) of the output pulse is dependent on the duration of accumulation of the pulses of the first pulse sequence ($nf$).

10. Method according to claim 9, wherein the step of generating said first and second pulse sequences comprises the step of generating a pulse sequence representative of engine speed, and generating a multiple of said pulse sequence, said generated multiple forming said first pulse sequence, and said generated pulse sequence representative of engine speed forming said second pulse sequence.

11. Internal combustion engine ignition control system having an ignition spark control generating circuit (42) to control the relationship between ON and OFF-time of a sequence of ignition coil energization pulses which vary in frequency comprising a digital counter (10);

first means (20, 21, 19) generating a first sequence of pulses (nf) representative of engine speed;

second means (20, 21) generating a second sequence of pulses (f), respresentative of engine speed, one of the sequences of pulses (nf) having a pulse repetition rate which is high with respect to the pulse repetition rate of the other sequence (f), an ignition angle computation stage (26) providing an output signal representative of an optimum ignition instant and connected to the counter (10) to reset the counter to a predetermined reference state;

a timing circuit (30) providing a timing interval;

connecting means (40, 15) connected to and controlled by the timing circuit (30) connecting the first sequence of pulses to the counter to cause the counter to accumulate a count value representative of the number of pulses of said first sequence during the timing interval, and then connecting the second sequence of pulses to the counter to cause the counter to count and accumulate the pulses of both said pulse sequences;

and means (33) connected to the counter and determining the count state of the counter with respect to a predetermined value, and providing an output signal, occurring at a time determined by the counting time of the counter with respect to said predetermined value.

12. System according to claim 11, wherein the means determining the count state of the counter comprises a count decoding stage (33) connected to the output of the counter (10);

a flip-flop (27) is provided connected to and controlled by the output of the count decoding stage (33);

and an AND-gate (36) connected to and controlled by (a) the output of the flip-flop (27) and (b) the output of the timing circuit (30), the output of the AND-gate forming the output of the system.

13. System according to claim 12, further comprising circuit means (32) controlling the duration of the timing interval of the timing circuit (30) as a function of the frequency of at least one of the pulse sequences.

14. System according to claim 11, wherein the means generating said first sequence of pulses (nf) includes the means generating the second sequence of pulses (f) and further includes a multiplying stage (19) to provide a first pulse sequence which has a pulse repetition rate which is a multiple of the pulse repetition rate of the second pulse sequence.

15. System according to claim 11, further comprising speed decode circuit means (32) connected to one of the pulse generating means and being connected to and controlling the duration of the timing interval of the timing circuit (30) to have a fixed duration below a predetermined decoded engine speed ($n_k$) and a variable duration as a function of engine speed above said predetermined engine speed ($n_k$).

16. System according to claim 11, wherein one of the pulse generating means comprises a transducer (21) coupled to the shaft of the engine and providing pulses representative an angular displacement of the engine shaft upon rotation thereof to form one of the sequences of pulses;

and the other of the pulse generating means comprises the structure of the aforementioned pulse generating means and further a multiplier (19) to provide the other sequence of pulses at a pulse repetition rate which is a multiple of the pulse repetition rate of the pulses of the aforementioned sequence of pulses.

17. System according to claim 11, wherein the counter (10) comprises a single digital counter.

18. System according to claim 11, wherein the connecting means includes a transfer switch (15) controlled by said timing circuit (30) and connected to the input of the counter to, selectively, connect to the counter input said first sequence of pulses (nf) or said second sequence of pulses (f), said transfer switch sequentially connecting said respective pulse sequences to the counter (10).

* * * * *